US011351934B2

(12) United States Patent
Durupt

(10) Patent No.: US 11,351,934 B2
(45) Date of Patent: Jun. 7, 2022

(54) CONNECTING STRUCTURE FOR AN ACTUATOR CONNECTED TO AN OPENING FLAP IN AN EXTERIOR TRIM COMPONENT

(71) Applicant: MOTHERSON INNOVATIONS COMPANY LIMITED, London (GB)

(72) Inventor: Xavier Durupt, Jebsheim (FR)

(73) Assignee: Motherson Innovations Company Limited, London (GB)

( * ) Notice: Subject to any disclaimer, the term of this patent is extended or adjusted under 35 U.S.C. 154(b) by 43 days.

(21) Appl. No.: 16/912,062

(22) Filed: Jun. 25, 2020

(65) Prior Publication Data

US 2021/0001786 A1 Jan. 7, 2021

(30) Foreign Application Priority Data

Jul. 2, 2019 (EP) .................................... 19184022

(51) Int. Cl.
*B60R 13/02* (2006.01)
(52) U.S. Cl.
CPC .. *B60R 13/0206* (2013.01); *B60R 2013/0293* (2013.01)
(58) Field of Classification Search
CPC ..... B60K 11/08; B60R 19/48; B60R 13/0206; B60R 2013/0293
See application file for complete search history.

(56) References Cited

U.S. PATENT DOCUMENTS

2018/0264933 A1  9/2018 Laurent et al.

FOREIGN PATENT DOCUMENTS

| DE | 10 2012 211 774 A1 | 1/2014 | |
|---|---|---|---|
| FR | 3 038 549 A1 | 1/2017 | |
| JP | H06 298132 A | 10/1994 | |
| WO | WO 2017/046382 A1 | 3/2017 | |
| WO | WO-2017046382 A1 * | 3/2017 | ........... B60K 11/085 |

OTHER PUBLICATIONS

European Search Report dated Oct. 22, 2019 with respect to counterpart European patent application 19 18 4022.2.
Translation of European Search Report dated Oct. 22, 2019 with respect to counterpart European patent application 19 18 4022.2.

* cited by examiner

*Primary Examiner* — D Glenn Dayoan
*Assistant Examiner* — Melissa Ann Bonifazi
(74) *Attorney, Agent, or Firm* — Ursula B. Day, Esq.

(57) ABSTRACT

A connecting structure for connecting an actuator to an opening flap for opening and closing an exterior trim component of a motor vehicle is disclosed, wherein the connecting structure has at least one carrier arrangement, which can be connected to the opening flap, and at least one connecting section arranged on the carrier arrangement, with which the opening flap can be connected to the actuator for moving the opening flap. The invention also relates to an exterior trim component with such a connecting structure and to a motor vehicle with such an exterior trim component.

7 Claims, 4 Drawing Sheets

CONNECTING STRUCTURE FOR AN ACTUATOR CONNECTED TO AN OPENING FLAP IN AN EXTERIOR TRIM COMPONENT

CROSS-REFERENCES TO RELATED APPLICATIONS

This application claims the priority of European Patent Application Ser. No. 19 184022.2, filed Jul. 2, 2019, pursuant to 35 U.S.C. 119(a)-(d), the subject matter of which is incorporated herein by reference.

BACKGROUND OF THE INVENTION

The present invention relates to a connecting structure for connecting an actuator to an opening flap for opening and closing an exterior trim component of a motor vehicle. Furthermore, the invention relates to an exterior trim component with such a connecting structure and to a motor vehicle comprising such an exterior trim component.

Exterior trim components of motor vehicles are, for example, bumpers in which increasingly components of the motor vehicle are integrated. For example, distance sensors or headlamp cleaning devices are integrated in the exterior trim components. In addition, the bumpers are also equipped with air flaps, for example to operate air-cooled intercoolers. Depending on the configuration, it is desirable to open or close the opening flap, for example, depending on the operating state of the motor vehicle, for which purpose these flaps are movably attached to the exterior trim components. To open and close the opening flap, the exterior trim components are equipped with actuators with which the opening flaps can be opened and closed.

In many cases, the exterior trim components are made of plastic, and efforts are being made to reduce the weight by continuously reducing the wall thickness of the exterior trim components. The same applies to the opening flaps. In conventional opening flaps, the actuators are connected directly to the opening flaps. Such an exterior trim component is disclosed in US 2018/0264933 A1. In particular, when the opening flaps have a small wall thickness, there is a risk that the surface of the opening flap on the visible side, i.e. the side that is visible from the outside, is damaged. Surface damage of this type occurs in particular when the opening flaps are used as air flaps which are opened and closed when the motor vehicle travels at high speed. The entire opening flap may deform due to the large applied aerodynamic forces. This adversely affects in both cases the overall appearance of the exterior trim components and of the vehicle equipped with them. The opening flap must then be exchanged for another one. Such an exterior trim component is described in WO 2017/046382 A1.

It would therefore be desirable and advantageous to provide an improved connecting structure for connecting an actuator to an opening flap for opening and closing an exterior trim component of a motor vehicle to obviate the afore-stated prior art shortcomings.

SUMMARY OF THE INVENTION

According to one aspect of the present invention, a connecting structure is proposed for connecting an actuator to an opening flap for opening and closing an exterior trim component of a motor vehicle, with which the above-mentioned disadvantages can be easily and inexpensively eliminated.

Another aspect of an embodiment of the present invention is to provide the connecting structure for an the exterior trim component cooperating therewith that remains dimensionally stable even when exposed to large aerodynamic and other forces, and that its visible side retains a high surface quality while limiting weight gain. In addition, it is an object of the invention to provide a motor vehicle with such an exterior trim component.

These and other aspects and objects of the present invention are achieved with an embodiment of the invention that relates to a connecting structure for connecting an actuator to an opening flap for opening and closing an exterior trim component of a motor vehicle, wherein the connecting structure has at least one carrier arrangement which is connected to the opening flap, and at least one connecting section arranged on the carrier arrangement, with which the opening flap is connected to the actuator for moving the opening flap.

A further object is achieved with an embodiment of an exterior trim component of a motor vehicle that includes an opening flap which is formed by the exterior trim component and is movable relative to the exterior trim component, or which is movably fastened to the exterior trim component by way of a fastening element and is arranged in an opening in the exterior trim component, and an actuator constructed to move the opening flap between an open position in which the opening flap opens the trim component or the opening and a closed position in which the opening flap closes the exterior trim component or the opening, wherein the exterior trim component has a connecting structure which cooperates with the opening flap, and the actuator is connected to the connecting structure by way of the connecting section.

Further advantageous embodiments are recited in the dependent claims.

A carrier arrangement is to be understood as a number of carriers that can cooperate with the opening flap. The opening flap can be stiffened with the proposed connecting structure so that the opening flap does not deform even under high loads and its surface is preserved. In addition, the connecting structure offers the possibility of stiffening the opening flap only where it is necessary to provide the necessary rigidity. It is therefore not necessary to increase the wall thickness of the entire opening flap, so that the increase in stiffness does not go hand in hand with excessive weight gain.

Due to the fact that the connecting section is arranged on the carrier arrangement, the force applied by the actuator to the opening flap is uniformly introduced into the opening flap when the opening flap is adjusted, so that the opening flap does not deform even under high loads.

In a further embodiment, the opening flap may be delimited by an outer edge and the carrier arrangement may have at least one outer carrier which follows the course of the outer edge. The outer carrier can extend entirely or partially along the outer edge of the opening flap, so that it not only increases the rigidity of the entire opening flap, but also the edge stiffness, thus particularly effectively preventing damage to the outer edge.

In a further embodiment, the opening flap may be delimited by an outer edge and the carrier arrangement may have at least one cross member whose two ends are arranged in the region of the outer edge. The cross member particularly effectively increases the stability of the carrier arrangement and therefore the rigidity of the opening flap while adding only little additional weight.

A further embodiment is characterized in that the carrier arrangement has at least one additional carrier, with one end of the additional carrier being arranged in the region of the outer edge. The additional carrier can extend into areas of the opening flap which are exposed to particularly high loads. The rigidity of the opening flap can thus be increased in a particularly targeted manner.

According to a further embodiment, the outer carrier, the cross member and/or the additional carrier are connected to one another. The fact that the outer carriers, the cross members and/or the additional carriers are connected to one another creates a particularly stiff, framework-like carrier arrangement which provides the opening flap with a particularly high rigidity without excessively increasing its weight.

According to a further embodiment, at least one stiffening rib is arranged on the outer carrier, the cross member and/or the additional carrier. Stiffening ribs are particularly suitable for giving the support arrangement and consequently the opening flap a high degree of stability without excessively increasing the weight.

According to a further embodiment, the connecting section includes a swivel joint or a ball joint, with which the opening flap can be connected to the actuator for moving the opening flap. Due to the fact that the opening flap is exposed to the airstream and thus to aerodynamic forces, forces exist that usually move the opening flap to the open position. It may therefore be sufficient to provide the actuator with an eccentric body which contacts the opening flap and, depending on the rotational position, adjusts between the open position and the closed position. As a result, only compressive forces, but no tensile forces, are transmitted between the actuator and the opening flap. However, if the opening flap gets jammed on the exterior trim component and/or the aerodynamic forces are too low to move the opening flap into the open position, the opening flap remains in an intermediate position.

With the aid of the swivel joint or ball joint, the actuator may be permanently connected to the connecting structure, thus allowing a defined movement between the open position and the closed position. In particular, not only compressive forces but also tensile forces can be transmitted between the actuator and the opening flap. A swivel joint enables rotation between the actuator and the connecting structure about a defined axis of rotation. The arrangement of the actuator and the course of the axis of rotation must therefore be coordinated. Conversely, the axis of rotation of a ball joint is not fixed, so that the arrangement of the actuator can largely be freely selected.

An embodiment of the invention relates to an exterior trim component of a motor vehicle, comprising
  an opening flap,
    which is formed by the exterior trim component and is movable relative to the exterior trim component, or
    which is movably attached to the exterior trim component by way of the transition section and is arranged in an opening in the exterior trim component,
  an actuator with which the opening flap (16) is movable between an open position, in which the opening flap opens the trim component or the opening, and a closed position, in which the opening flap closes the exterior trim component or the opening, wherein
  the exterior trim component has a connecting structure according to one of the preceding embodiments, which cooperates with the opening flap, and
  the actuator is connected to the connecting structure by way of the connecting section.

The technical effects and advantages that can be achieved with the proposed external trim component correspond to those that have already been discussed for the present connecting structure. In summary, it should be pointed out that it is possible to increase the stiffness of the opening flap without appreciable weight gain. This avoids deformation of the opening flap even under high loads, so that the desired visual appearance of the opening flap is retained even after longer operating times.

In a further embodiment, the opening flap has a flat base body with a first side and a second side, with the first side forming a visible side that is visible from the outside, and the carrier arrangement being connected to the base body with the second side.

In principle, to increase the rigidity of the opening flap, it is irrelevant whether the connecting structure is arranged on the visible side or on the second side facing the interior of the motor vehicle. However, for appearance reasons it is advisable to arrange the connecting structure on the second side of the opening flap, which is located opposite the visible side. Consequently, the connecting structure does not have to be integrated into the design of the exterior trim component.

According to a further embodiment, the carrier arrangement is connected with the second side to the base body by gluing, welding or clipping. In this way, the connection of the connecting structure to the opening flap can be implemented in a simple manner.

In a further embodiment, the opening flap is delimited by an outer edge, with the carrier arrangement encompassing the outer edge in a form-fitting manner. In this embodiment, a positive connection is created between the carrier arrangement and the opening flap, which is also at least partially visible from the visible side. The visible part can be designed as a decorative strip or the like, as a result of which the opening flap can be optically separated from the rest of the exterior trim component.

In a further development, the carrier arrangement is connected in sections to the base body. In particular, if the opening flap is not designed as a separate component but is formed by the exterior trim component, the opening flap is deformed at least in regions when moved. In this embodiment, the carrier arrangement is connected to the opening flap only where the latter is not deformed at all or only to a small extent. This ensures that no additional tensions are introduced into the opening flap when moving, which prevents the visible side of the opening flap from being damaged. In addition, the connection is not subjected to additional stress when the opening flap is moved, thereby maintaining its reliability.

Another embodiment is characterized in that the connecting structure has at least one receiving section for components of the motor vehicle. As mentioned at the beginning, more and more components, in particular sensors, are being installed in the bumper of the motor vehicle. In this embodiment, the proposed opening flap can be used to hold components of the motor vehicle. No additional measures to attach these components to the bumper are necessary.

In a further embodiment, the exterior trim component may be designed as a bumper and the opening flap as an air flap. As mentioned at the beginning, intercoolers can also be cooled with air which requires a correspondingly high-volume flow of the ambient air to be directed to the intercooler. The opening in the exterior trim component must be dimensioned accordingly. In addition, it must be possible to open the air flap sufficiently wide. As a result, the loads on the air flap are particularly high. The proposed opening flap also withstands these loads without the need for any significant weight gain. In particular, in this embodiment, it is not absolutely necessary to permanently connect the carrier arrangement to the air flap. Rather, it is sufficient to allow the carrier arrangement to interact with the air flap in such a way that compressive forces can be transmitted, which can be achieved through contact between the connecting structure and the air flap. Tensile forces do not need to be transmitted. The actuator positions the air flap in the closed position as a result of a corresponding movement of the connecting structure and holds it there in place. When the air flap is to be placed in the open position, the connecting structure is retracted. The aerodynamic forces acting on the air flap then place the air flap in the open position.

An implementation of the invention relates to a motor vehicle, comprising an exterior trim component according to one of the previously described embodiments.

The technical effects and advantages that can be achieved with the proposed external trim component correspond to those discussed above for the present opening flap. In summary, it should be pointed out that the stiffness of the opening flap can be increased without appreciable weight gain. This avoids deformation of the opening flap even under high loads, so that the desired visual appearance of the opening flap is retained even after longer operating times.

BRIEF DESCRIPTION OF THE FIGURES OF THE DRAWINGS

Exemplary embodiments of the invention will now be explained in more detail below with reference to the accompanying drawings, wherein.

DETAILED DESCRIPTION OF PREFERRED EMBODIMENTS

Figure 1A:
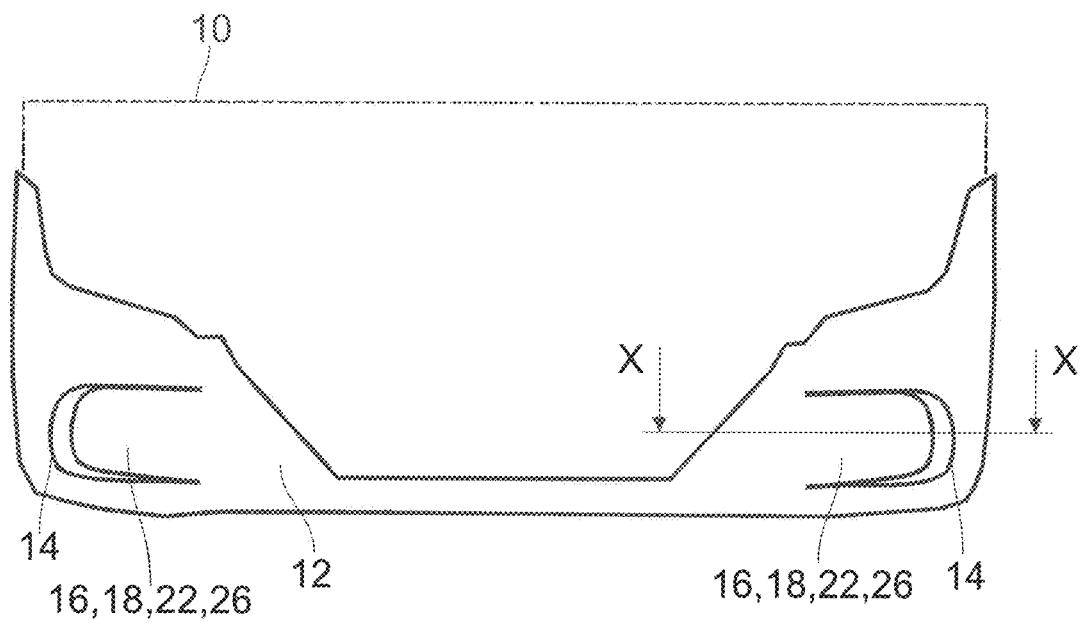
FIG. 1A shows a basic front view of a motor vehicle which has an exterior trim component with an opening flap according to the present invention.

Throughout all the Figures, same or corresponding elements are generally indicated by same reference numerals.

FIG. 1 shows in a front view a motor vehicle 10, which includes an exterior trim component 12. The exterior trim component 12 has two opening flaps 16 which are formed by the exterior trim component 12. For this purpose, the exterior trim component 12 has corresponding openings 14. The opening flaps 16 are designed such that they can be moved relative to the rest of the exterior trim component 12. In FIG. 1A, the opening flap 16 is designed as an air flap 18, so that when the air flap 18 is in an open position, as illustrated in FIG. 1A, air can be guided into the interior of the exterior trim component 12. There, the air can be used, for example, to cool an unillustrated intercooler.

Figure 1B:
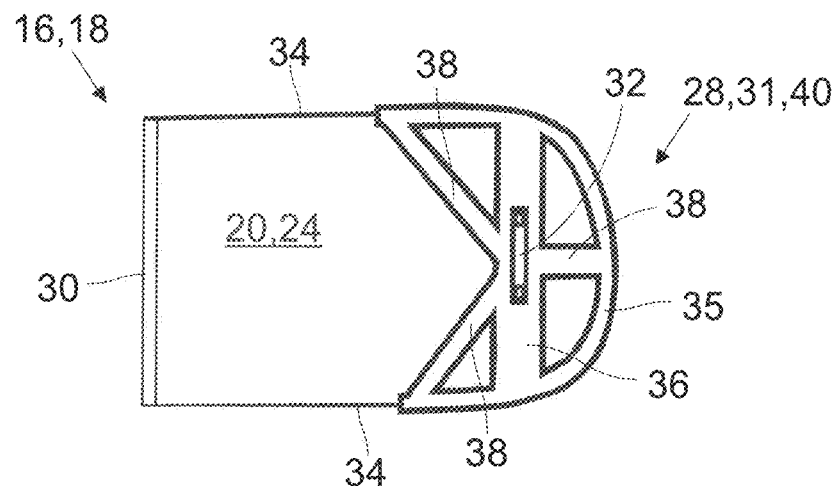
FIG. 1B shows a separate illustration of the opening flap shown in FIG. 1A.

In FIG. 1B, the opening flap 16 is shown separately in a plan view. The opening flap 16 has a flat base body 20 having a first side 22 and a second side 24. The first side 22 of the base body 20 is the visible side 26, which is visible from the outside. In FIG. 1A, one looks at the visible side 26 of the base body 20, while in FIG. 1B, one looks at the second side 24. A connecting structure 28 which is used in particular to stiffen the base body 20 is arranged on the second side 24 of the base body 20.

Because the opening flap 16 is formed by the trim component 12, the opening flap 16 forms a transition section 30 in which the opening flap 16 can be bent and thus moved relative to the rest of the trim component 12. A connecting section 32, with which the opening flap 16 can be connected to an actuator 33 (see FIG. 1C) constructed to move the opening flap 16 between an open position and a closed position, is arranged on the connecting structure 28.

The opening flap 16 has an outer edge 34 which delimits the base body 20. The connecting structure 28 includes a carrier arrangement 31 with an outer carrier 35, which essentially follows the course of the outer edge 34. In addition, the carrier arrangement 31 of the connecting structure 28 includes a cross member 36, which is arranged with its two ends in the region of the outer edge 34. In addition, the carrier arrangement 31 has three additional carriers 38 which each have a respective end arranged in the region of the outer edge 34 and which run from the respective ends to the interior of the base body 20. The outer carrier 35, the cross member 36 and the additional carriers 38 are connected to one another so as to form a framework 40. In the illustrated example, the connecting section 32 is arranged on the cross member 36, while the transition section 30 is arranged on the base body 20 spaced apart from the connecting structure 28.

Figure 1C:
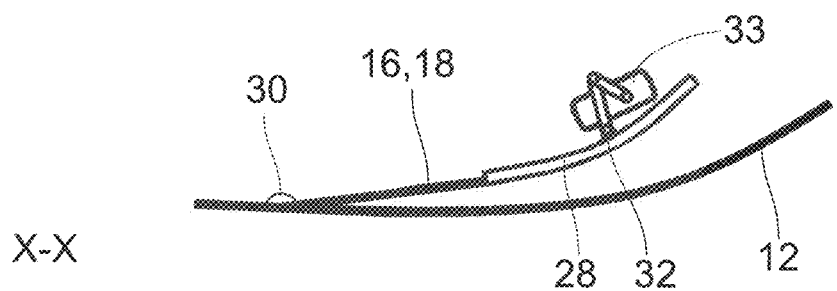
FIG. 1C shows a sectional view through the exterior trim component along the section plane X-X defined in FIG. 1A.

FIG. 1C shows a cross section through the exterior trim component 12 along the section plane X-X defined in FIG. 1A. It can be seen that the opening flap 16 is bendable in the transition section 30 and is therefore movable relative to the rest of the exterior trim component 12. In addition, the actuator 33 can be seen, with which the opening flap 16 can be moved between the open position and the closed position. The actuator 33 is connected to the opening flap 16 via the connecting section 32 arranged on the connecting structure $28_1$. The actuator 33 can be activated, for example, via a control system (not shown) of the motor vehicle 10, depending on the operating state, in order to thus move the opening flap 16 between the open position and the closed position.

FIGS. 2A to 2D show four different embodiments of the connecting structure $28_1$-$28_4$ according to the invention, each in a top view of the second side 24 of the opening flap 16. In the first exemplary embodiment of the connecting structure $28_1$ shown in FIG. 2A, the connecting structure 28, includes the aforementioned cross member 36 and the likewise aforementioned outer carrier 35, with the outer carrier 35 forming a receiving section 42 in which a component of the motor vehicle 10, for example, a distance sensor or wiring can be arranged. In the first embodiment, the connecting section 32 is arranged on the cross member 36.

Figure 2A:
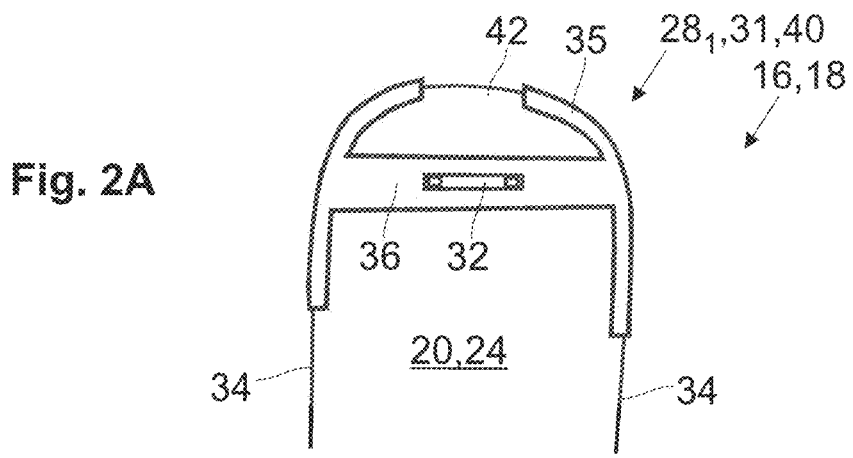
FIG. 2A shows a plan view of a first exemplary embodiment of a connecting structure fastened on an opening flap.
Figure 2B:
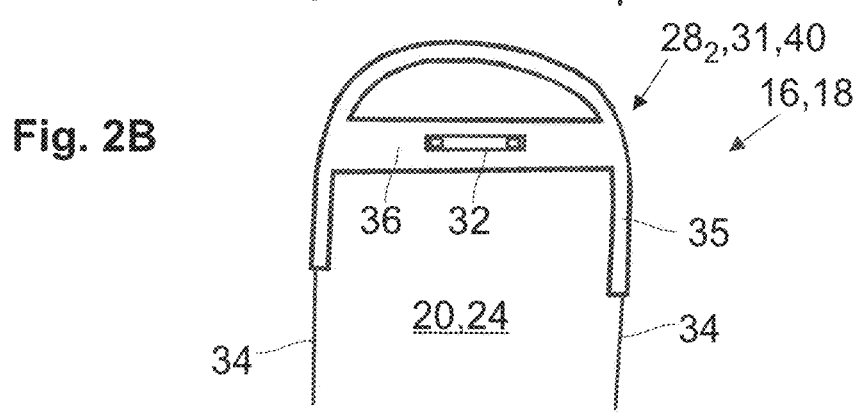
FIG. 2B shows a plan view of a second exemplary embodiment of a connecting structure fastened on an opening flap.

FIG. 2B shows a second exemplary embodiment of the connecting structure $28_2$, which largely corresponds to the first exemplary embodiment of the connecting structure $28_1$; however, the outer carrier 35 in this embodiment does not form a receiving section 42.

Figure 2C:
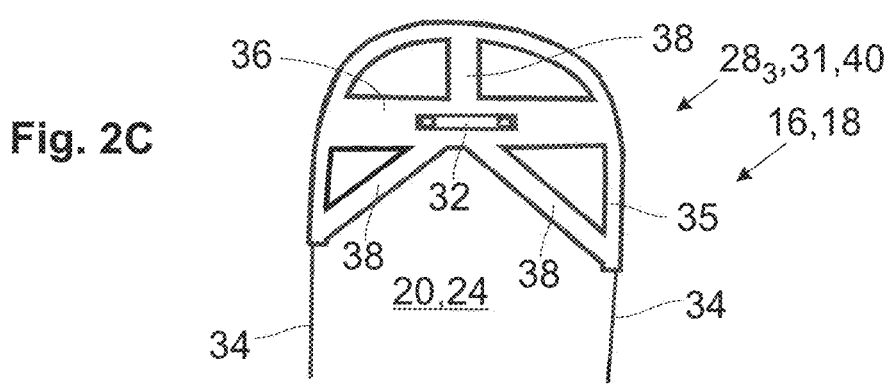
FIG. 2C shows a plan view of a third exemplary embodiment of a connecting structure fastened on an opening flap.

FIG. 2C shows a third exemplary embodiment of the connecting structure $28_3$ according to the invention, which largely corresponds to the connecting structure 28 shown in FIGS. 1A to 1C. The connecting structure $28_3$ according to the third exemplary embodiment has a total of three additional carriers 38 which each run in an approximately Y-shaped pattern between the outer carrier 35 and the cross member 36. In this exemplary embodiment, the outer carrier 35, the cross member 36 and the additional carriers 38 form a framework 40. In the first, second and third exemplary embodiment of the connecting structure $28_3$, the connecting section 32 is arranged on the cross member 36.

Figure 2D:
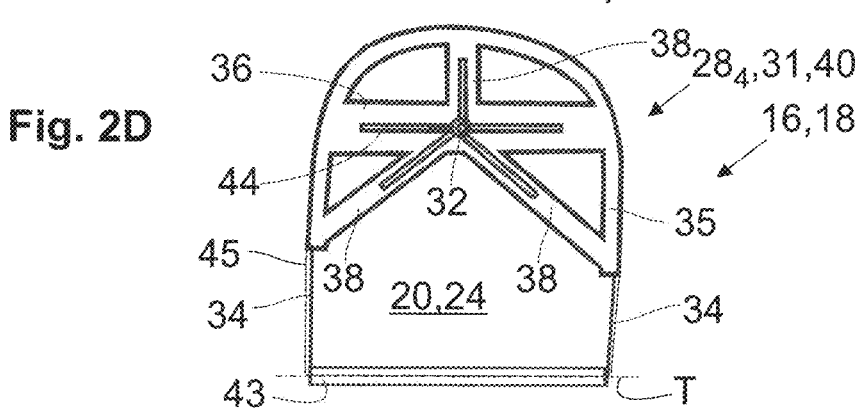
FIG. 2D shows a plan view of a fourth exemplary embodiment of a connecting structure fastened on an opening flap.

FIG. 2D shows a fourth exemplary embodiment of the connecting structure $28_4$ according to the invention, which largely corresponds to the third exemplary embodiment. In addition, however, stiffening ribs 44 are provided, which give the carrier arrangement 31 additional rigidity. In addition, in this exemplary embodiment, the opening flap 16 is designed as a separate component and is fastened to the trim component 12 in an opening 45 of the trim component 12 by a hinge-shaped fastening element 43. The fastening element 43 is designed such that the opening flap 16 is not, as in the other exemplary embodiments, bent when moving between the open position and the closed position in the transition section 30, but is instead rotated about an axis of rotation T. The opening 45 is open in the open position, while the opening 45 is closed in the closed position.

Figure 3A:
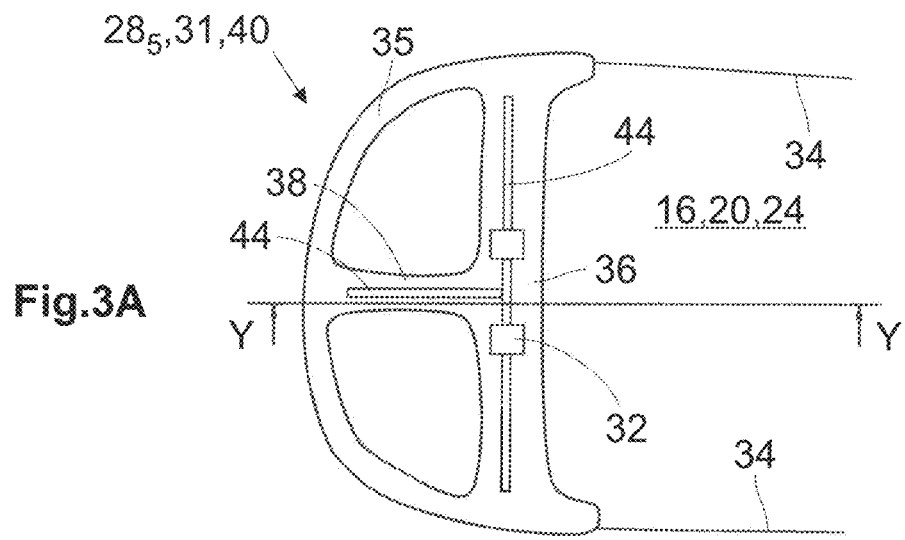
FIG. 3A shows a plan view of a fifth exemplary embodiment of a connecting structure fastened on an opening flap.
Figure 3B:
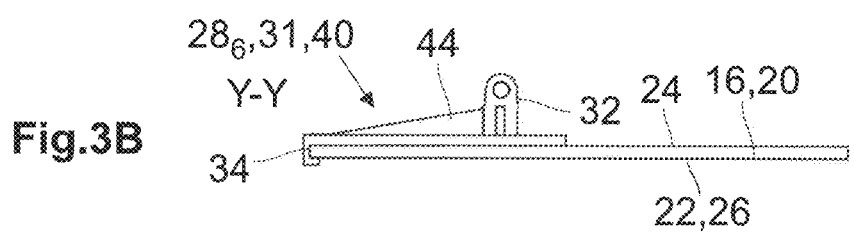
FIG. 3B shows a sectional illustration along the sectional plane Y-Y defined in FIG. 3A.

FIG. 3A shows a fifth exemplary embodiment of the connecting structure $28_5$ according to the invention in a plan view and in FIG. 3B in a sectional view along the sectional plane Y-Y defined in FIG. 3A. As can be seen in particular from FIG. 3B, the outer carrier 35 engages here around the outer edge 34 of the opening flap 16, thus creating a positive connection between the carrier arrangement 31 and the opening flap 16. A portion of the outer carrier 35 is therefore visible from the visible side 26. This portion can be designed, for example, as a decorative strip for setting the opening flap 16 apart from the rest of the exterior trim component 12. The embodiments of the connecting structure $28_1$ to $28_4$ shown in FIGS. 2A to 2D can be connected to the opening flap 16 in this way.

As also seen from FIGS. 3A and 3B, the connecting structure $28_5$ of the fifth exemplary embodiment also has the previously mentioned stiffening ribs 44, which in this exemplary embodiment are arranged on the cross member 36 and the additional carrier 38.

Figure 4A:
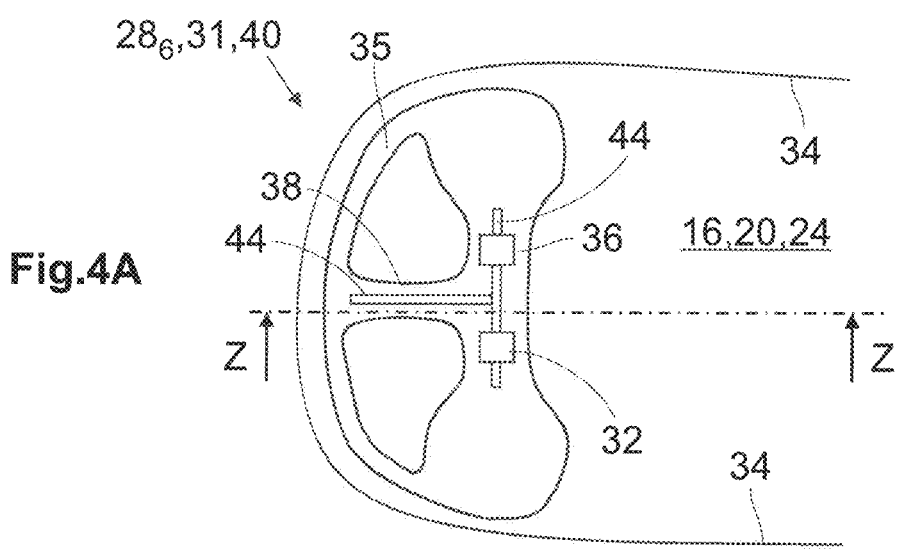
FIG. 4A shows a plan view of a sixth exemplary embodiment of a connecting structure fastened on an opening flap.
Figure 4B:
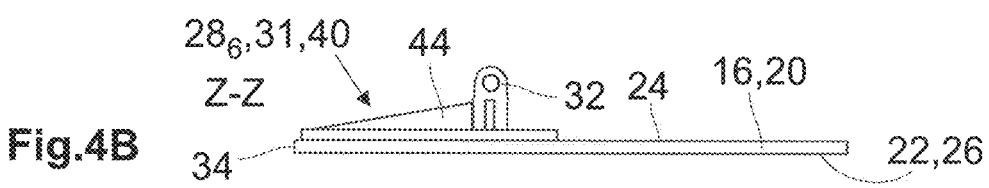
FIG. 4B shows a sectional view along the sectional plane Z-Z defined in FIG. 4A

FIGS. 4A and 4B show a sixth exemplary embodiment of the connecting structure $28_6$ according to the invention analogous to the illustrations of FIGS. 3A and 3B. In this case, the connecting structure $28_6$ is connected to the opening flap on the second side 24, for example by gluing, welding or clipping. The connecting structure $28_6$ is therefore not visible from the first side 22.

Figure 5:
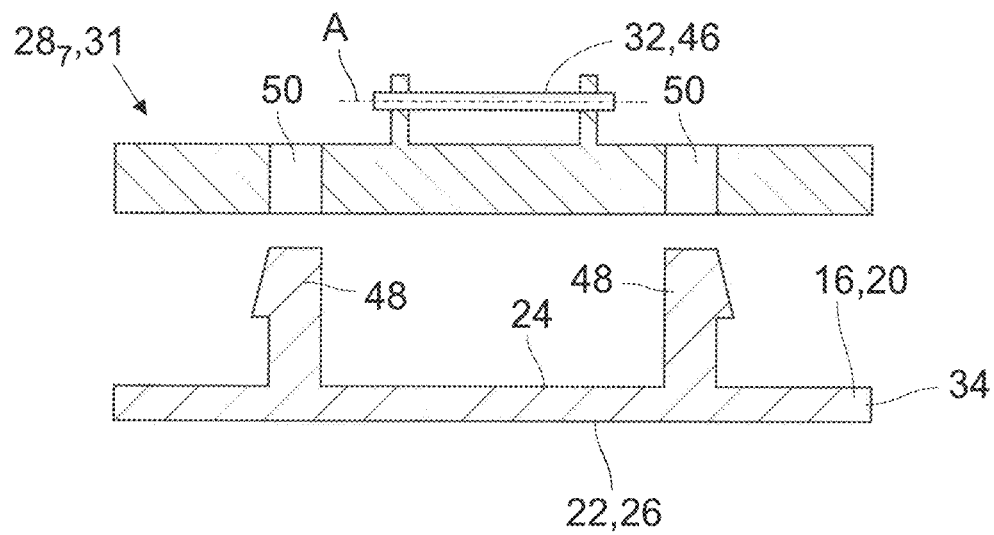
FIG. 5 shows a basic sectional illustration through a seventh exemplary embodiment of an opening flap and a connecting structure.

FIG. 5 shows a seventh exemplary embodiment of a connecting structure $28_7$ and an opening flap 16 in a schematic sectional illustration. The connecting section 32 is constructed in the form of a swivel joint 46, so that the actuator 33 (not shown here) can be connected to the opening flap 16 for rotation about a fixed rotation axis A. In the connected state, both tensile and compressive forces can be transmitted between the actuator 33 and the opening flap 16.

Furthermore, the connecting structure $28_7$ is in this case clipped to the opening flap 16 by a positive connection. For this purpose, the opening flap 16 has a number of projections 48 which form an undercut. The projections 48 are guided through corresponding through openings 50 in the connecting structure $28_7$. The projections 48 have a certain elasticity, so that they are slightly compressed, particularly in the area forming the undercuts, when they passed through the through openings 50. When the connecting structure 27 is in contact with the opening flap 16, the compressed areas return to their starting position, thus establishing the positive connection.

Figure 6:
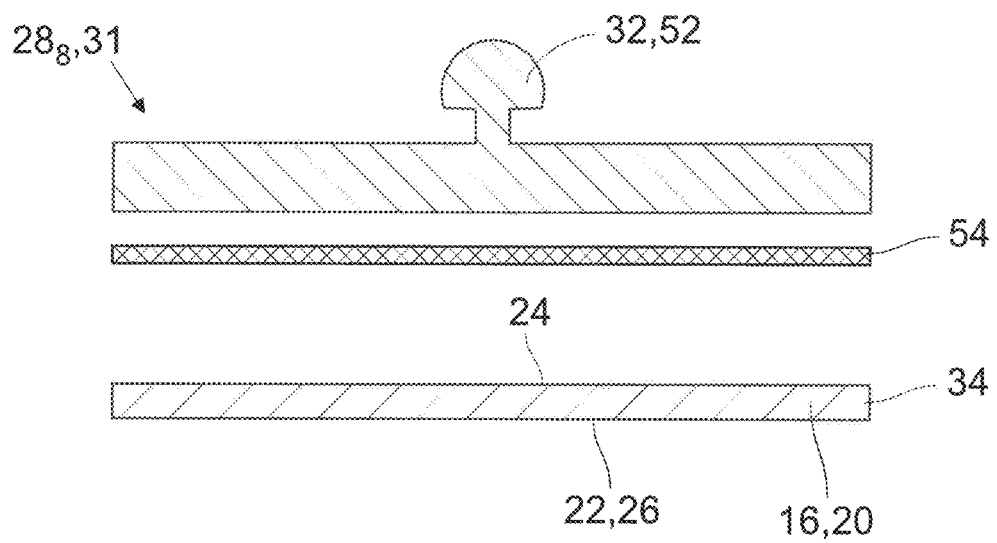
FIG. 6 is a basic sectional view through an eighth embodiment of an opening flap and a connecting structure.

FIG. 6 shows an eighth exemplary embodiment of a connecting structure $28_8$, likewise in a schematic sectional illustration. In this case, the connecting section 32 is designed as a ball joint 52, so that the actuator 33 can be connected to the opening flap 16 for rotation about any axis. In this case, too, both tensile and compressive forces can be transmitted between the actuator 33 and the opening flap 16. Furthermore, the connecting structure 28 is here fastened to the opening flap 16 with an adhesive 54.

Not shown is an embodiment where the connecting section 32 is designed as a bellow, which forms a swivel joint. The connecting structure 28 can be produced, for example, with a two-component injection molding process, with the bellow being implemented with a rubber-like plastic.

While the invention has been illustrated and described as embodied in a connecting structure as described, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:
1. A connecting structure for an actuator connected to an opening flap for opening and closing an exterior trim component of a motor vehicle comprising,
   a carrier arrangement connected to the opening flap, and
   a connecting section being arranged on the carrier arrangement such that the opening flap is connected with the actuator by way of the connecting section, and is moved by the actuator, wherein the opening flap is delimited by an outer edge and the carrier arrangement comprises at least one outer carrier which follows the course of the outer edge.
2. The connecting structure according to claim 1, wherein the opening flap is delimited by an outer edge and the carrier arrangement comprises at least one cross member, with the two ends of the at least one cross member arranged in the region of the outer edge.
3. The connecting structure according to claim 1, wherein the carrier arrangement comprises at least one additional carrier, with one end of the at least one additional carrier arranged in the region of the outer edge.

4. The connecting structure according to claim 2, wherein the outer carrier, the cross member and/or the additional carrier are connected to one another.

5. The connecting structure according to claim 4, wherein at least one stiffening rib is arranged on the outer carrier, the cross member and/or the additional carrier.

6. An exterior trim component comprising,
a carrier arrangement connected to an opening flap, and
a connecting section being arranged on the carrier arrangement such that the opening flap is connected with the actuator by way of the connecting section, and is moved by the actuator, wherein the opening flap is delimited by an outer edge and the carrier arrangement comprises at least one outer carrier which follows the course of the outer edge, wherein the connecting section comprises a swivel joint or a ball joint, by way of which the opening flap is connected to the actuator for moving the opening flap, wherein the opening flap is delimited by an outer edge and the carrier arrangement surrounds the outer edge in a form-fitting manner.

7. The exterior trim component according to claim 6, wherein the opening flap comprises a flat base body with a first side and a second side, and wherein the first side forms a visible side that is visible from the outside, and
the carrier arrangement is connected to the base body with the second side.

\* \* \* \* \*